Sept. 23, 1969  T. R. CAMP  3,468,422
CERAMIC FILTER BOTTOM DIRECTLY SUPPORTING MEDIA
Filed Feb. 3, 1967  2 Sheets-Sheet 1

INVENTOR
THOMAS R. CAMP
By Darbo, Robertson & Vandenburgh
Attorney

Sept. 23, 1969    T. R. CAMP    3,468,422
CERAMIC FILTER BOTTOM DIRECTLY SUPPORTING MEDIA
Filed Feb. 3, 1967    2 Sheets-Sheet 2

INVENTOR
THOMAS R. CAMP
By Darbo, Robertson & Vandenburgh
Attorney

United States Patent Office

3,468,422
Patented Sept. 23, 1969

3,468,422
CERAMIC FILTER BOTTOM DIRECTLY SUPPORTING MEDIA
Thomas R. Camp, Boston, Mass., assignor to Chicago Bridge & Iron Company, Oak Brook, Ill., a corporation of Illinois
Filed Feb. 3, 1967, Ser. No. 615,293
Int. Cl. B01d *23/18, 29/38;* C02b *1/20*
U.S. Cl. 210—274                                     5 Claims

ABSTRACT OF THE DISCLOSURE

A line of blocks forms a single channel extending transversely of a flume into which the channel opens downwardly. Each block has along its top several many-slitted dispersion nozzles arranged in protective and water-directing depressions. The nozzles open downwardly through stems which aid in uniform distribution of air for backwash scouring by limiting air flow to small holes. Air can be admitted without adding water for preliminary scouring. All cement surfaces not covered by ceramic tile are coated or sealed to protect the grout from attack by acids and alkalies which may be used in the backwash water for cleaning.

INTRODUCTION

The invention of which this disclosure is offered for public dissemination in the event adequate patent protection is available relates to filter bottoms. Water filters usually comprise concrete bottoms over which a filter bottom is constructed for supporting the filter media and carrying to a flume the filtered water which percolates through the media, as well as supplying backwash water (and perhaps air) in the opposite direction.

There are at least two well-known types of prior filter bottoms. One is formed by concrete slabs forming a false bottom, and provided with multislotted dispersion nozzles. Some of these nozzles have stems extending downwardly by which a mixture of water and air can be supplied in backwashing. This type is described in Bulletin 12–F–84 of Walker Process Equipment Inc.

Another type is ceramic tile, with perforations through the upper side of the tile. For seeking uniformity of distribution of backwash water, a lower primary channel feeds an upper secondary channel at spaced points. This is disclosed in a bulletin, entitled "Compound Duplex Tile Filter Bottom," published by F. B. Leopold Co., Inc.

Both of these were objectionable in having much exposed concrete which would be adversely affected by acid if used in backwash water. This necessitated removal of anything which had to be acid-cleaned. The latter had numerous objections, including the need for a coarse support layer between the media and the bottom. The latter was not at all suitable for the use of air in connection with backwashing, and the former did not provide good distribution of the air when used.

According to the present invention, a filter bottom is provided which overcomes these various objections. Furthermore, it distributes air with reasonable uniformity even when used for scouring while no backwash water is being supplied.

Moreover, the nozzles are well protected against breakage, being below the height of adjacent formations on which boards can be supported while work is going on inside of the empty tank.

Additional objects and advantages of the invention will be apparent from the following description and from the drawings.

DESIGNATION OF FIGURES

GENERAL DESCRIPTION

Figure 1:
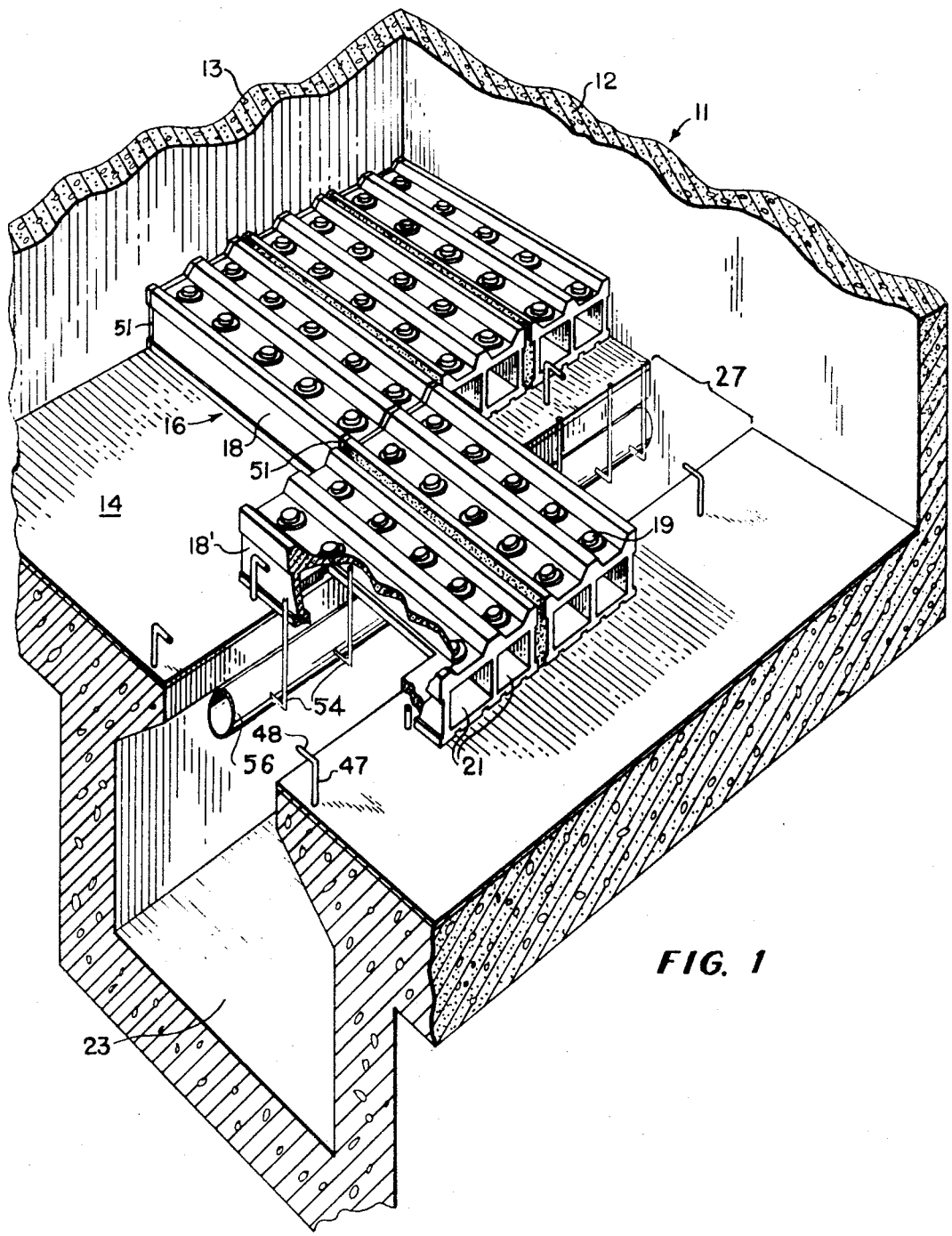
FIGURE 1 is a perspective view of a filter bottom according to the present invention partly installed in a filter tank.

The filter bottom 16 of this invention is laid in a tank 11 which is usually a concrete tank formed by walls 12 which may be the end walls and walls 13 which may be the side walls, these walls surrounding a floor 14 on which the "filter bottom" 16 is laid. The filter media, which may be sand or anthracite coal particles, for example, will rest on the bottom 16. It is not necessary to support the filter media 15 on a lower layer of coarser and heavier material such as gravel, as has been the more common practice heretofore. The filter bottom of the present invention is formed mainly from blocks 18, each having numerous nozzles 19 which communicate with passages 21 extending through the blocks lengthwise. During filtration, the water or other liquid being filtered, filters down through the media, through the nozzles 19 and into passages 21, flows along the passages 21 toward a flume 23 and into the flume 23. The flume 23 is thus below the floor 14 and extends one full horizontal dimension of the tank, usually lengthwise.

DETAILS OF BLOCKS

Figure 2:
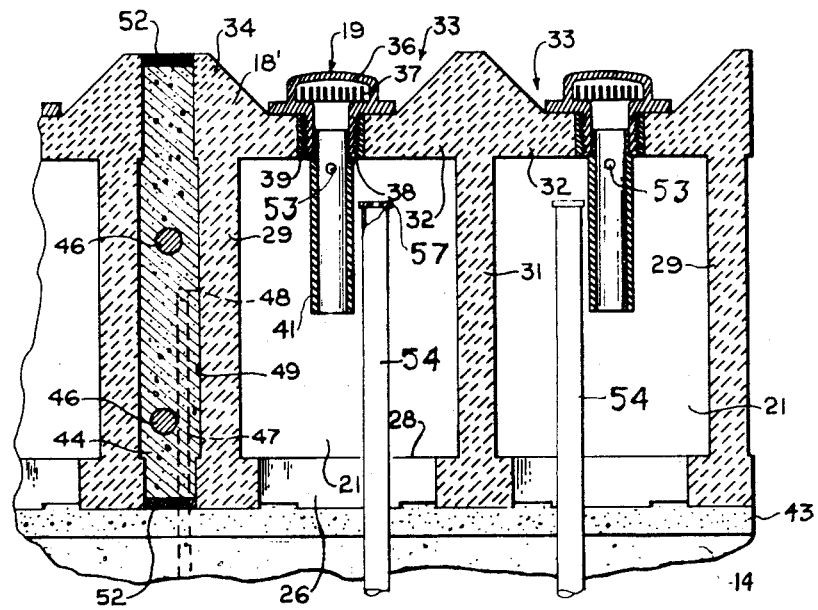
FIGURE 2 is a transverse cross section to one filter block and part of another at a location bridging the flume, approximately on the line 2—2 of FIG. 3.

One of the blocks of this invention is shown in cross section in FIG. 2. This happens to be one of the blocks 18' bridging the flume 23. The difference between it and the blocks 18 is that the blocks 18' are provided with openings 26 along the bottom, along that part of the length which lies over the opening 27 of the flume. Elsewhere, the blocks are provided with closed bottom walls 28. In addition, each block has side walls 29 and mid wall 31. The top walls 32 are especially shaped to provide channels 33, each extending the full length of the block and defined by sloping walls 34.

Nozzles 19 are preferably removably mounted at the bottom of channel 33. Each nozzle is provided with a head 36 having numerous slots 37 therein preferably along the vertically disposed sides so that these slots face horizontally. Each nozzle is provided with a threaded base 38 which threads into a collar 39 preferably cemented in place in block 18 or 18' by a suitable epoxy cement. Usually and preferably, especially if there is to be backwashing with a mixture of air and water, or scouring with air alone applied, each nozzle will be provided with a downwardly extending tail pipe 41. These may be cemented, or welded, in place, or integral as in FIG. 4. A small hole 53 is provided near the top of each tail pipe, the rest of the pipe being imperforate, except open top and bottom, to serve as a water seal. The small hole meters air for uniformity during air scouring or air and water backwashing, and permits escape of air when filtering begins.

Securing of blocks

The blocks are preferably laid on a layer of cement mortar 43. Also grout 44 of cement mortar is applied along each of the side walls 29. Along the spanning blocks 18', reinforcing rods 46 are preferably provided, yielding a very dependable structural strength. In addition, anchor rods 47, having their lower ends embedded in tank floor 14 during the laying thereof, have their angled upper ends embedded in the grout wall 44, thereby firmly anchoring the spanning blocks 18' in place. This anchoring is made all the more reliable by shallow recesses 49 in the sides of blocks 18 and 18' which key them to the grout 44.

It is not necessary that the blocks 18 be thus firmly anchored down, because there is no net upward hydraulic pressure. Indeed, the pressure downward on the closed bottom surfaces of channels 21 are even higher than the hydraulic pressure on the upper surfaces thereof.

The ends of the blocks 18, 18', are preferably sealed to each other, or to the adjacent walls of tanks, by gasket 51, which are preferably formed of foam neoprene rubber of 3/8 inch thickness, relaxed, compressed to 1/8 inch. Those between the blocks are preferably formed to fit the faces of the blocks, and cemented to one end of each block.

Acid proofing

Preferably all mortar and concrete, and all other material which is sensitive to (would be harmed by) any acid or alkali likely to be used in cleaning, is thoroughly sealed-off from contact with any contents of the tank by a layer 52 of impervious sealant unaffected by such materials. Various epoxy compounds are known to be suitable for this. Of course, grout and cement mixtures which are themselves immune could be used, at least in theory.

Air supply

It is very desirable to be able to backwash with a mixture of water and air. It is also desirable to be able to supply air alone without supplying backwash water. According to the present invention, good distribution is obtained by making all of the air enter the tail pipes or plunge pipes 41 through a single orifice 53 near the top of each. The tail pipe should be otherwise imperforate down to its bottom opening, so that all of the water, if water is supplied at the same time, will enter through the bottom of the pipe. A tail pipe length below orifice 53 of at least 3.5 inches is desired in order to provide a substantial head loss through the orifice 53. An orifice size of 3/16 inch diameter is suitable, when the nozzles are spaced on six inch centers.

To provide a satisfactory degree of uniformity of air pressure in one lateral channel 21 as compared to another, it is preferred that each be supplied with air through a riser 54 branching off from a main 56. The air supply in main 56 and the branches therefrom may be of polyvinyl chloride plastic. As seen in FIG. 2, the branches 54 are preferably provided with orifice caps 57. The orifices therein are preferably small enough to provide substantial head loss, so that the slight head loss lengthwise of mains 56 will be insignificant, as will be variations between commercially available pipe sizes used in risers 54. Thus, the orifice diameter may be about one-half of the internal diameter of the risers 54. The orifice caps 57 can be drilled with precision, and could even be varied to compensate for head loss in main 56, although this is not deemed necessary. The important consideration is that the total head loss through each branch 54 be accurately predetermined so that they can all be equal, or otherwise correlated by design.

In speaking of substantial head loss, the word "substantial" means that other head losses are relatively much smaller. For example, the loss through the branches 54 other than through the orifice would be only about 6 percent of that through the orifice, so that commercial variations in the pipe size will only cause a percentage variation of this small 6 percent.

The total amount of air flow may be only a few minutes once in several days, and hence the power required to compensate for making the orifices smaller than would be desirable except for uniformity, is of no significance.

OPERATION

In general, operation may be in accordance with any of the known operating procedures. However, the use of air, either separately for scouring or jointly with backwash water is likely to be more desirable than heretofore because of the great uniformity of its distribution. In speaking of air alone, it is assumed that water will be maintained in the tank.

When air is supplied, it quickly displaces all of the water in the mains 56 and branches 54. The water in the mains 56 can be discharged quickly through blow-off pipes 59 long enough to be water sealed after the water in mains 56 is displaced. Before air is supplied, the water level in the filter should be drawn down at least twelve inches below the tops of backwash drains or gutters 61 so that the air scouring can be quite vigorous and even stir the bed without danger that the filter particles will be carried off. Alternatively, water may be supplied during the use of the air, but the water may be too low to fluidize the bed by the water alone.

After about thirty seconds of air scouring, the air is shut off and wash water supplied with the rate increased gradually through about thirty seconds. A fifteen or twenty percent expansion of the bed for a long enough period to reduce the turbidity of the waste water in gutters 61 to about 75 p.p.m. is contemplated.

If the air is to be used concurrently with wash water supplied at a bed-fluidizing rate, there should be about thirty-nine inches between the top of the bed and the top of the gutters. The water level in the filter is first lowered to about one foot above the top of the bed. Air is then initially applied, followed by wash water when air bubbles appear uniformly over the filter area. Within a few seconds after the bed has been fludized, it will be thoroughly mixed from top to bottom. After shutting off the air, the water should be continued, for perhaps another fifteen seconds, before the overflow into the gutter begins. Thereafter, the wash water should be continued at a rate maintaining bed expansion, until the bed has had time to restratify, assuming it to be a bed that is stratified either by size or type of material.

The method first described is preferred unless there are deep mud balls which need to be broken up. The first method does break up mud balls at the surface while leaving the bed stratified.

MODIFICATIONS AND FURTHER DETAILS

Figure 4:
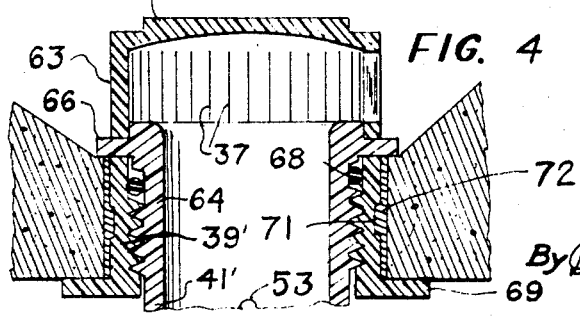
FIGURE 4 is a fragmentary sectional view showing a preferred form of the nozzle.

FIG. 4 shows a slightly modified form of nozzle which is at present preferred. A slotted cap 63 is cemented to a base 64 having a tail pipe 41' forming a continuation thereof. The base 64 is externally threaded and has an external flange 66. The cap 63 is provided with a hexagonal top portion 67 to which a wrench may be applied for screwing the assembly into collar 39'. An O-ring 68 may be used to prevent any flow between base 64 and collar 39'. Collar 39' may have a bottom flange 69, and it may also have a groove 71 so that the cement 72 will be keyed to it. This form is quite easy to assemble, and the head loss approaching the cap 63 is relatively low so that the discharge is more certainly determined by the accurately formed slots 37. At present it is contemplated that these slots will be 0.01 inch wide and 0.53 inch long (in height) at the outside surface of cap 63. This will keep the filter media from entering and will also provide uniform discharge. The slots preferably taper to a width of 0.04 inch on the inside surface of cap 63. The internal diameter of base 64 and tail pipe 41' at present contemplated is 1.25 inches.

The slots are narrow enough to prevent media from entering, so that media 15 can rest directly on the bottom. Their size and number are preferably chosen to give a slot outlet area totalling 0.212 square inch per nozzle. In the size stated there should be 40 slots per nozzle. This is so that with the nozzles centered at 6 inch intervals in both directions, the slot area will equal 0.588 percent of the bed area. It is preferred to keep this slot-to-bed area ratio as low as 0.60, or in any event low enough to provide substantial head loss during backwashing so that with expected backwash rates the variation in wash rate is less than 10 percent over the bed area.

The blocks are of ceramic tile, glazed or unglazed, which is immune to the liquids to which they are exposed.

Consideration is being given to some other means than cement 72 for holding and sealing collars 39 or 39', or the base 64 in place. A rubber bushing or washer which would expand into locking relationship is one possibility.

Figure 3:
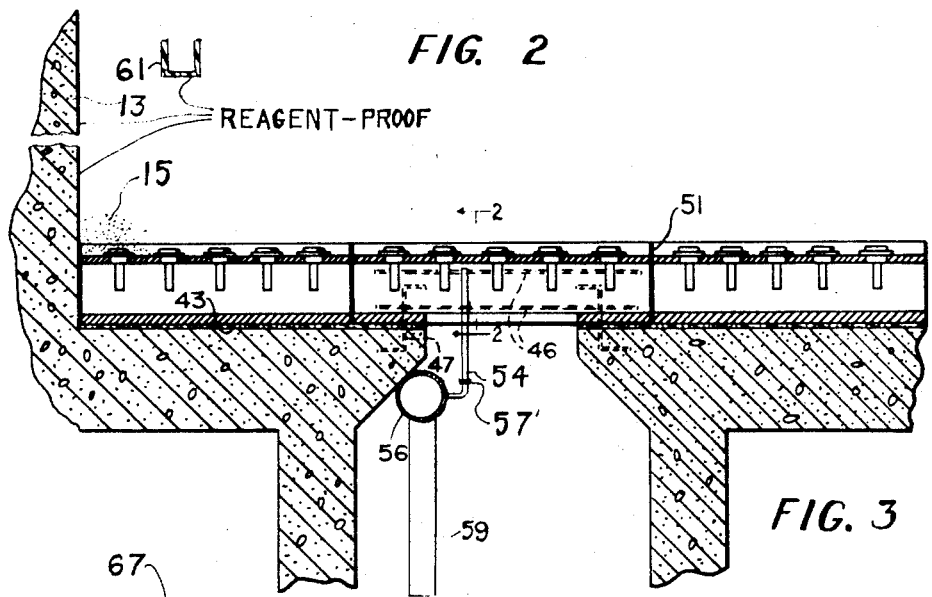
FIGURE 3 is a fragmentary cross-sectional view of the tank showing longitudinal cross-sectional views of the blocks of this invention, with an in-line constriction 57' instead of orifice cap 57.

FIGURE 3 illustrates a position for a constricting orifice member 57' that is at present deemed preferable to the use of an orifice cap. It allows the air to flow more gently and smoothly from an open upper end of tube 54. This substantially eliminates any danger of so disturbing the wash water flowing into passages 21 as to entrain water in the air stream.

It is a great advantage to clean the media and nozzle orifices in place occasionally, using acid or alkali solutions, as required. It is only necessary to drain the water out and fill with the solution from the bottom upward, allow a suitable soaking time, and then backwash. This requires that all surfaces, including the concrete walls, be resistant to the acid and alkali solutions to be used for cleaning. Without this protection, the filter media and nozzles would have to be removed from the bed for acid cleaning. The coating of the various concrete wall surfaces will probably be in the nature of paint or thin coatings and so no separate layer has been illustrated.

It is very desirable to protect the nozzles against breakage, as by the elevated ceramic walls 34 on both sides thereof, which hold boards used during construction above the nozzles. One broken nozzle would let sand pass, causing ruin to the bed and clogging one of the passages 21.

I claim:

1. A filter bottom including a plurality of lines of ceramic blocks each having a longitudinally extending passage therein communicating with a like passage of an adjacent block in the line, the passage in at least one of said blocks of each line opening to a flume, dispersion nozzles in the top of each block, each nozzle having an upwardly extending conduit in open communication with said passage, and a large number of narrow slot orifices through which the conduit communicates with the space above the block.

2. A filter bottom according to claim 1 in which said conduits each has a constricted orifice between its interior and the passage near the top thereof, with each conduit being otherwise substantially imperforate to an open bottom and well spaced below the constricted orifice to provide a water seal while a sufficient quantity of air is blown upwardly through the nozzles to stir a bed of filter material thereon.

3. A filter bottom according to claim 1 in which the slot-to-bed ratio of area is as low as about 0.60 percent to maintain wash rate uniformity within 10 percent.

4. A filter bottom including a plurality of lines of ceramic blocks each having a longitudinally extending passage therein communicating with a like passage of an adjacent block in the line, the passage in at least one of said blocks of each line opening downward to a flume, dispersion nozzles in the top of each block and including an upwardly extending conduit in open communication with said passage, and a large number of narrow slot orifices through which the conduit communicates with the scope above the block, in which said conduits each has a constricted orifice between its interior and the passage near the top thereof, with each conduit being otherwise substantially imperforate to an open bottom and well spaced below the constricted orifice to provide a water seal while a sufficient quantity of air is blown upwardly through the nozzles to stir a bed of filter material thereon, in combination with air supply means including a main extending lengthwise of the flume and a branch from the main for supply of air exclusively to each longitudinal passage, said branches being of constricted nature to provide a substantial head loss as compared to that of the main, and each of the branches having an accurately predetermined head loss with predetermined correlation between different branches to ensure evenness of distribution of the air flow.

5. A filter bottom having a plurality of horizontal passages and a flume communicating with said passages, constricted communication means leading upwardly from said passages for distributing air throughout a filter bed carried by the filter bottom, and air supply means including a main extending lengthwise of the flume and a branch from the main for supply of air exclusively to each longitudinal passage, said branches being of constricted nature to provide a substantial head loss as compared to that of the main, and each of the branches having an accurately predetermined head loss with predetermined correlation between different branches to ensure evenness of distribution of the air flow.

References Cited

UNITED STATES PATENTS

| | | | |
|---|---|---|---|
| 2,528,065 | 10/1950 | Lundberg | 210—293 |
| 1,429,477 | 9/1922 | Williamson | 210—292 |
| 1,871,122 | 8/1932 | Kretzschmar | 210—293 X |
| 2,711,829 | 6/1955 | Hulsbergen | 210—292 |
| 3,110,667 | 11/1963 | Stuppy | 210—293 X |

FOREIGN PATENTS

| | | |
|---|---|---|
| 956,826 | 4/1964 | Great Britain. |

SAMIH N. ZAHARNA, Primary Examiner

U.S. Cl. X.R.

210—293

PO-1050
(5/69)

UNITED STATES PATENT OFFICE
CERTIFICATE OF CORRECTION

Patent No. 3,468,422                    Dated Sept. 23, 1969

Inventor(s) Thomas R. Camp

It is certified that error appears in the above-identified patent and that said Letters Patent are hereby corrected as shown below:

Column 4, line 34, "fludized" should be "fluidized".

Column 6, line 10, "scope" should be "space".

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents